J. S. HUNTER.
TRACTION DEVICE.
APPLICATION FILED MAR. 25, 1912.
1,060,684.
Patented May 6, 1913.
2 SHEETS—SHEET 1.
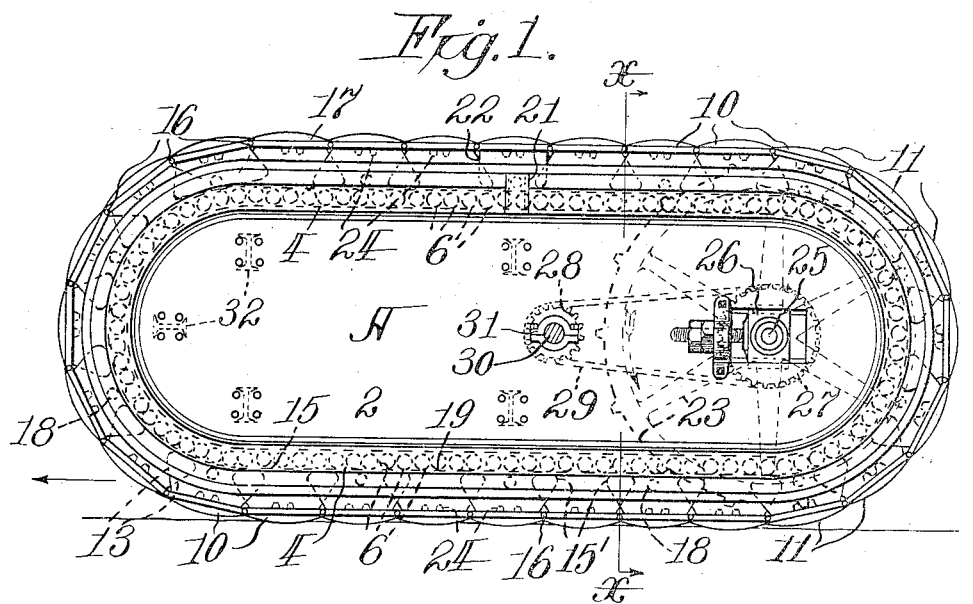
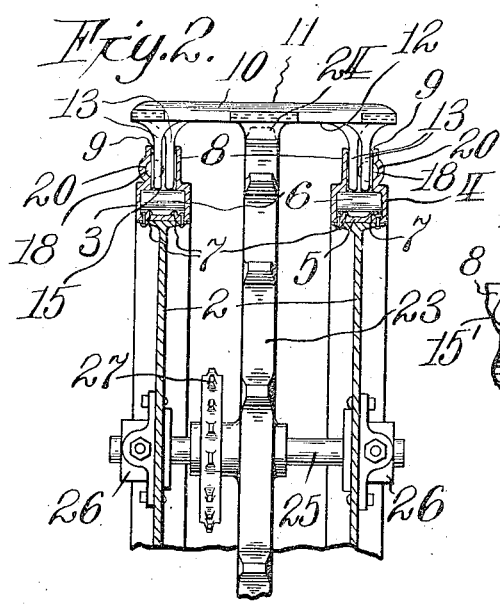
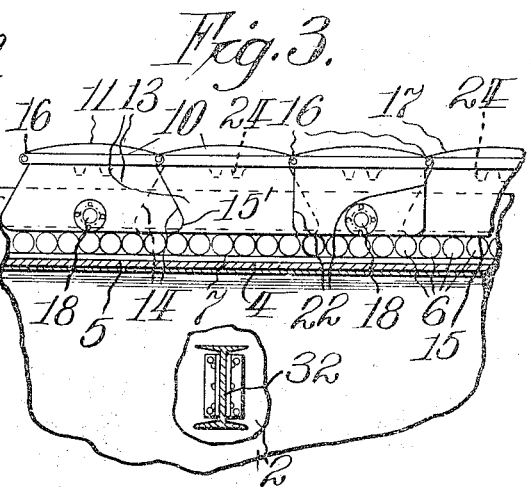
Witnesses:
Inventor:
John S. Hunter,
by Attorney

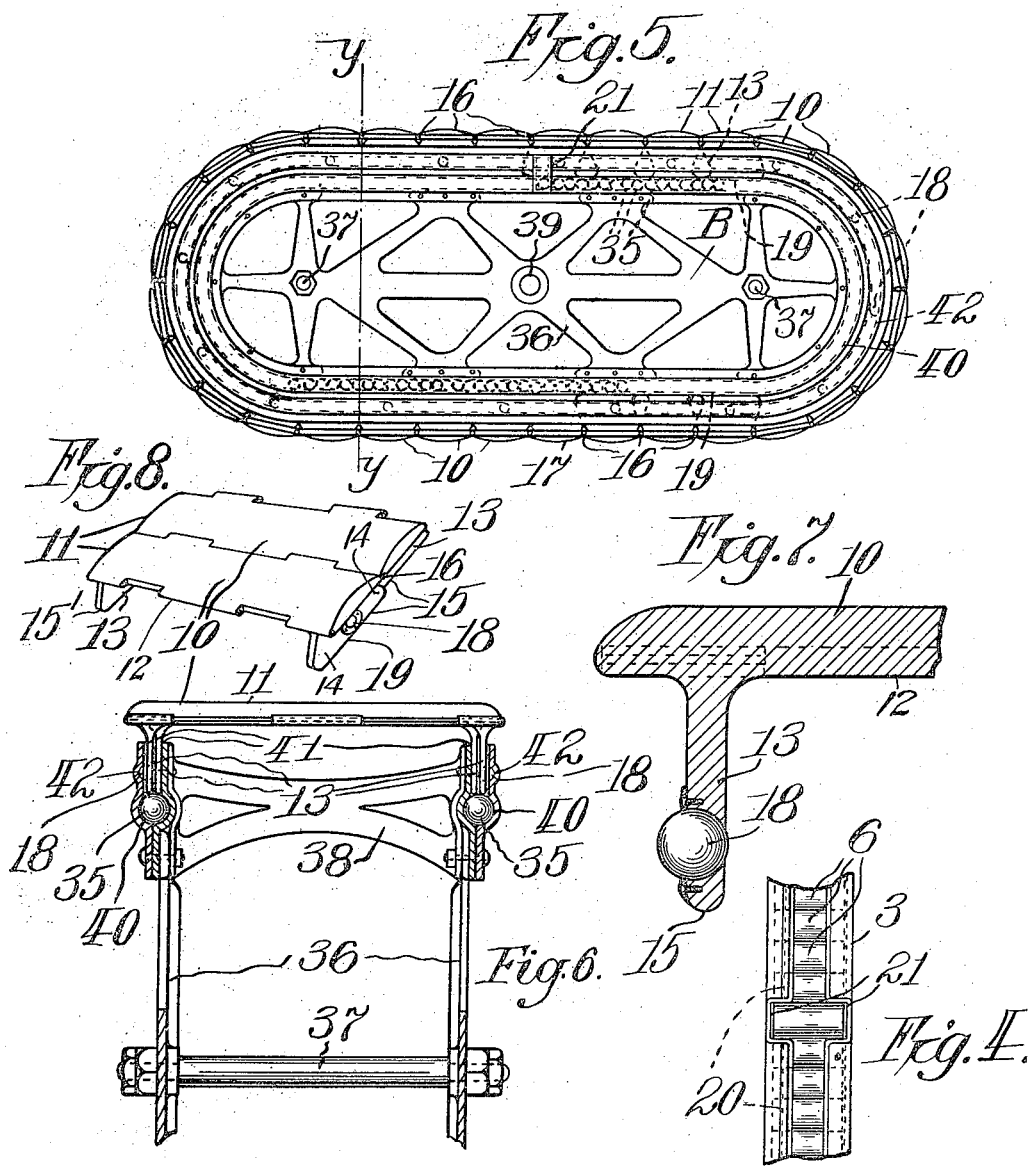

UNITED STATES PATENT OFFICE.

JOHN S. HUNTER, OF EGELAND, NORTH DAKOTA.

TRACTION DEVICE.

1,060,684.  Specification of Letters Patent.  Patented May 6, 1913.

Application filed March 25, 1912. Serial No. 686,186.

*To all whom it may concern:*

Be it known that I, JOHN S. HUNTER, a citizen of the United States, residing at Egeland, in the county of Towner, State of North Dakota, have invented a new and useful Improvement in Traction Devices, of which the following is a specification.

This invention relates to traction devices or runners and has a novel construction and arrangement of its parts as hereinafter shown and described.

The object of the invention is to provide a traction device consisting of a series of shoes hinged together to make an endless tread, said shoes having projecting flanges which form an endless track for a series of anti-friction roller bearings to travel on. The roller bearings being retained in guideways which extend about the periphery of the frame thus doing away as far as possible with friction and giving a device which will require a small amount of power to operate. My device is also provided with anti-friction bearings to eliminate friction caused by side thrust while the device is in motion.

It is obvious that my device can be used to take the place of the wheel or runners on ordinary vehicles and is so constructed as to travel easily over various kinds of roads in summer and winter.

In the accompanying drawings which form part of this specification and with which I have illustrated my invention, Figure 1 is a side elevation of my device where power is employed to operate the same; Fig. 2 is a section of Fig. 1 on the line X—X a portion thereof being broken away; Fig. 3 is a detail cross section illustrating various parts of my construction; Fig. 4 is a detail plan of a portion of my device; Fig. 5 is a side elevation of a modified form of my device adapted to be used when draft means are employed instead of power; Fig. 6 is a section taken on the line Y—Y, Fig. 5, a portion thereof being broken away; Fig. 7 is a cross section of a portion of one of the shoes used in my device and Fig. 8 illustrates two of the shoes in perspective showing the method of hinging the same.

The frame A is oblong in shape with circular ends and composed of parallel sides 2 in the form of I beams on which are mounted guideways 3 and 4 which extend about the entire periphery of the frame A and are substantially T shaped being hollow throughout their length. The horizontal leg 5 of the T shaped guideways 3 and 4 forms a channel for anti-friction rollers 6 and has two parallel projecting ribs 7 on which the rollers are adapted to run, thus reducing the friction surface and preventing dust and dirt from clogging and grinding the rollers. The other leg 8 of the T shaped guideway projects outwardly from the frame body A and is open, forming a continuous opening or slot 9 about the frame body. The guideways or channels 3 and 4 are placed about five or six inches from the outer edge of the leg 8 so they will travel free of mud and dirt. The shoes 10 are substantially rectangular in shape, having a curved outward face 11 and a flat inner face 12. Integral with the shoe 10 and near each end are flanges 13 projecting at right angles from the inner face 12 and parallel to each other. These flanges are widened at their outer portion 14 to form a long bearing surface 15 parallel with the face 12 and are rounded off on the corners 15'. The adjacent sides of the shoes 10 are formed to be joined together by hinge bolts or pins 16 thus forming a continuous tread 17 about the periphery of the frame A. It will be seen that when the shoes pass around the circular ends of the frame A there are no open joints between the shoes to catch rocks and dirt which would tend to stop the operation and break the parts. Flanges 13 of the shoes 10 project into the openings 9 and are so arranged that one pair on one shoe are spaced wide apart and come in contact with the outer wall of the openings 9, the other pair on the next succeeding shoe coming in contact with the inside wall of the opening or slot 9 thus the pairs of flanges intermesh each other successively about the entire frame. The surfaces 15 ride upon the rollers 6 and form endless parallel tracks 19 for the frame A to travel on. The flanges on the shoes 10 which come in contact with the outer wall of the openings 9 are provided at their lower extremity with anti-friction bearings 18 and the outer wall of the opening in the leg 8 of the guideways 3 and 4 is formed with a groove 20 to receive the anti-friction bearings 18, the groove 20 is continuous about the guides or channels 3 and 4. The guideways 3 and 4 are provided with an enlarged slot 21 preferably on the upper horizontal portion of the guideways (see Figs. 1 and 4) to form an opening for the inserting of the rollers 6 into the guideways and also for placing the shoes 10 which have the anti-friction bearings 18 on their flanges into the guideways so the bearing 18 will enter the groove 20 of the opening 9. The flanges 13 on one of the shoes 10 are formed with straight sides 22 as illustrated in Fig. 3 to allow the shoes 10 to be placed close together when they are inserted into the guideways 3 and 4. The shoes can be placed in the slots or opening 9 separately and then joined together by inserting a hinge pin 16 of ordinary construction. It is obvious that if one of the hinge pins break or if one of the shoes become detached it cannot get out of the channels 9 as those shoes carrying the anti-friction bearings 18 are held in the grooves 20 and the other shoes are held by their intermeshing flanges 13.

The tread 17 is driven by a gear wheel 23 which meshes with gear teeth 24 formed integral with the inner face 12 of the shoes 10, said gear wheel 23 is mounted on a shaft 25 which is journaled in adjustable bearings 26 secured to the sides 2 of the frame A, being driven by sprockets 27 and 28 which are connected by the chain 29. The sprocket 28 is keyed on the drive shaft 30 which is mounted on the frame A in bearings 31 and is adapted to be driven by any suitable means. The sides 2 of the frame A are braced by I-beams 32.

In the form illustrated in Figs. 5 and 6 no driving elements are used. This is designed to be used as a wheel or runner where draft means are employed. Here I have illustrated ball bearings 35 to be used in place of the rollers 6. The shoes 10 being substantially the same as in my power device and form a continuous tread 17. In this construction the frame B is made light by using open iron work for the sides 36 which are spaced apart by rods 37 and braces 38, thus being securely braced. Openings 39 are provided in the sides 36 of the frame for the axle of a vehicle.

The ball bearings 35 are held in the channels or guideways 40 conforming in shape to said bearings and slots 41 are provided for the reception of the flanges 13 of the shoes 10. A groove 42 is also provided for the anti-friction bearings 18 in the wall of the slots 41. The operation of this construction is in every way identical to the first described, with the exception of the driving means. Thus it will be seen that in the operation of my device the tread 17 will rest firmly on the ground and the frame A will travel freely on its bearings 6 over the endless tracks 19 formed by the intermeshing flanges 13, the bearings 18 preventing friction from side thrusting of the device, thereby reducing the friction to the smallest possible amount and affording easy operation.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is: —

1. A traction device comprising a frame having parallel guideways at the periphery thereof, said guideways retaining a series of free roller bearings forming a continuous anti-friction guideway, an endless chain of shoes about said frame, the adjacent edges of which being formed with interconnected tongues and grooves and each of said shoes having a pair of inwardly projecting side flanges which form tracks for said frame, every other pair of flanges on said shoes straddling the succeeding pair of flanges on the next shoe to limit lateral movement of said shoes and means secured to the outer sides of the straddling flanges for eliminating friction of said track against the walls of said guideways while said chain is in motion.

2. A traction device comprising a loop shaped frame having an anti-friction guideway about the periphery thereof, a series of shoes joined together to form a continuous tread, said shoes having projecting flanges into said guideway and forming a track on which said frame is adapted to travel and anti-friction bearings secured to the outer sides of every other one of said flanges adapted to travel in a continuous groove formed in the side of said guideways to prevent the displacement of said track and reduce the friction between the track and said guideways.

3. A device of the class set forth, comprising a loop shaped frame, parallel endless channels about said frame, a series of rollers adapted to run freely in said channels and a continuous tread about said frame composed of a series of shoes hinged together, said shoes having inwardly projecting flanges which form an endless track over which said rollers are adapted to travel and means for retaining said rollers in said channels independent of said track.

4. A traction device, comprising a loop shaped frame about which extend parallel channels adapted to retain a series of free roller bearings, a tread formed of an endless chain of shoes hinged together, said shoes having a curved outer face, a pair of inwardly projecting flanges intermeshing with the flanges on the adjacent shoes, the pairs of flanges on each alternate shoe straddling the pair of flanges on the next succeeding shoe making a continuous track of equal width for said roller bearings, and means for engaging the inner face of said shoes centrally between said flanges to evenly drive said device.

5. A traction device comprising a frame having parallel guideways at its periphery, a chain of shoes surrounding the periphery of the frame, a series of free roller bearings adapted to run freely in said guideways which are so formed as to prevent the escapement of said roller bearings, a pair of flanges projecting at right angles from the inner faces of the opposite ends of said shoes, the pair of flanges on one shoe straddling the flanges on the next succeeding shoe, alternately, the outer edges of all of said flanges being parallel with the inner faces of said shoes, said flanges extending into said guideways and against said roller bearings, forming a continuous track for said device.

6. A traction device, comprising a frame having parallel channels for free anti-friction bearings about its periphery, an endless track about said channels, means for retaining said anti-friction bearings in said channel independent of said track, said track having intermeshing flanges projecting into said channels, and against said anti-friction bearings to form a continuous tread for said device.

7. A traction device, comprising a frame having parallel channels for free anti-friction bearings about its periphery, means formed integral with said channels for retaining said anti-friction bearings, an endless tread about said channels, said tread having intermeshing flanges projecting about said channels and against said anti-friction bearings to form a continuous track for said device and means secured on the outer sides of said flanges to hold said tread in said channels.

In testimony whereof I have signed my name to this specification in the presence of two subscribing witnesses.

JOHN S. HUNTER.

Witnesses:
H. L. FISCHER,
G. N. DEEBACH.